United States Patent [19]

Weichel

[11] 4,337,834
[45] Jul. 6, 1982

[54] IMPLEMENT TO BE MOUNTED ON A TRACTOR FOR THE LOOSENING OF SOIL

[76] Inventor: Ernst Weichel, Postfach 1180, 7326 Heiningen, Fed. Rep. of Germany

[21] Appl. No.: 141,183

[22] Filed: Apr. 17, 1980

[30] Foreign Application Priority Data

Apr. 18, 1979 [DE] Fed. Rep. of Germany ....... 2915628

[51] Int. Cl.³ .............................................. A01B 59/06
[52] U.S. Cl. ..................................... 172/448; 172/47
[58] Field of Search ................... 172/47, 63, 134, 248, 172/250, 253, 439, 443, 448, 451, 676; 280/415 R, 415 A, 446 A, 456 A, 460 A, 461 A

[56] References Cited

U.S. PATENT DOCUMENTS

| | | | |
|---|---|---|---|
| 2,453,390 | 11/1948 | Werner | 280/461 A |
| 2,645,989 | 7/1953 | Prince | 172/451 X |
| 2,868,305 | 1/1959 | Surratt | 172/47 |
| 3,223,178 | 12/1965 | Clifford et al. | 280/461 A X |
| 3,391,949 | 7/1968 | Abbott | 172/248 X |
| 3,876,013 | 4/1975 | Dunn | 172/448 X |

FOREIGN PATENT DOCUMENTS

| | | | |
|---|---|---|---|
| 217774 | 10/1958 | Australia | 172/448 |
| 2652739 | 5/1978 | Fed. Rep. of Germany | 172/47 |
| 1088474 | 9/1954 | France | 172/443 |

*Primary Examiner*—Richard T. Stouffer
*Attorney, Agent, or Firm*—Toren, McGeady & Stanger

[57] ABSTRACT

An implement for loosening soil arranged to be propelled by a tractor includes at least one supporting structure extending transversely of the direction of travel of the tractor and at least two agricultural tools releasably connected to the supporting structure. Additional implements whose tools are to be driven by the power take-off of the tractor through at least one universal joint shaft can be connected to the supporting structure. The supporting structure is V-shaped and is arranged inverted with respect to the soil so that a passage is formed enabling the universal joint shaft driving the tools of the additional implement to extend therethrough.

6 Claims, 1 Drawing Figure

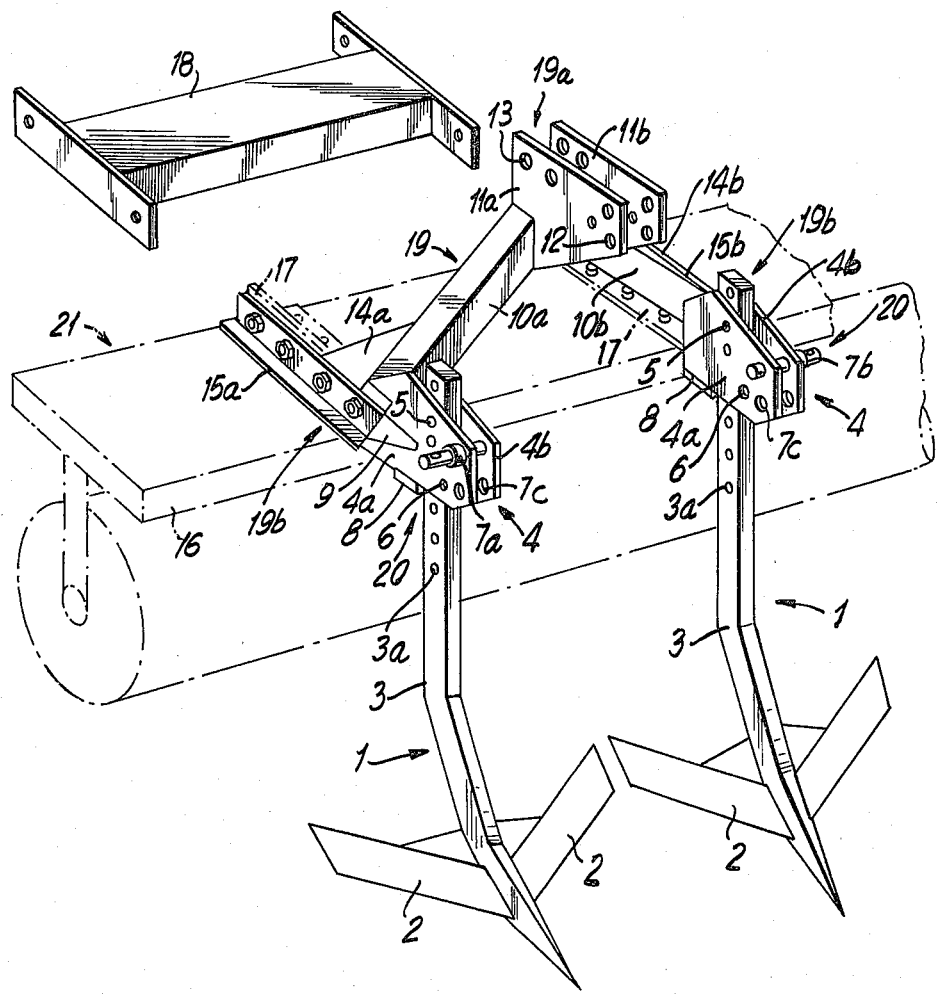

IMPLEMENT TO BE MOUNTED ON A TRACTOR FOR THE LOOSENING OF SOIL

BACKGROUND OF THE INVENTION

The invention relates to an implement to be mounted on a tractor for the loosening of soil, with at least one support tube which is arranged transversely of the travel direction and is composed of two parts which are connected to each other, at least two loosening bits which are rigidly, but preferably adjustably, arranged on the support tube, and connecting members hinged to the implement or to the support tube for additional implements arranged behind the loosening bit, the additional implements being provided with implement tools which are to be driven by the power take-off shaft of the tractor through at least one universal joint shaft, wherein the support tube has a tunnel-shaped recess arranged approximately behind the center of the vehicle through which there extends a universal joint shaft which connects the power take-off shaft of the tractor and the input shaft of the implement and extends at least in one vertical position of the loosening bits or of the additional implement; in accordance with German Patent Application No. 2,652,739.

Known implements of this type for the loosening of soil which can be mounted on a tractor are arranged behind the tractor wheels at a relatively short distance, so that, at an also relatively short distance behind the implement, another implement with implement tools which can be driven from the power take-off shaft of the tractor through at least one universal joint shaft can be mounted so as to be separately vertically adjustable. This facilitates the drive of the tools of the additional implement through a universal joint shaft which is simple, quite resistant to wear and does not impede the function and operation of the implements. Since the support tube of the known implement is arranged transversely of the travel direction and extends approximately horizontally and is composed of two parts between which there is arranged a tunnel-shaped recess behind the center of the vehicle through which recess there extends a universal joint shaft which connects the power take-off shaft of the tractor with the input shaft of the implement in at least one vertical position of the loosening bits or the additional implement, this support tube must be dimensioned very strong and must have in its center region several bridge-shaped reinforcements which lead to a high weight of the implement. The reinforcements mounted on the two parts of the support tube have at least two tie bars whose forward ends are rigidly connected to the mounting part of the implement on the side of the tractor and which are connected, either directly or through vertical webs, to the ends of the parts of the support tubes adjoining the tunnel-shaped recess.

At the rearward ends of the tie bars, eyes for receiving adjusting spindles are provided which are connected in an articulated manner for connecting rods which are hinged to parts of the support tube.

All these components increase the weight, the structural length and the manufacturing costs of the implement, so that it can frequently not be purchased by the owners of lightweight tractors or cannot be lifted by means of the power lift of relatively lightweight tractors.

In addition, under unfavorable conditions of use, the horizontal support tube frequently causes cloggings of the space between adjacent loosening bits with soil clods, straw, green crops, etc.

The invention solves the task of improving and simplifying the known implement to be mounted on a tractor for the loosening of soil, so that it is possible to achieve a significantly shorter structural length, a significantly lower weight and significantly lower production costs and the operation without cloggings even under unfavorable soil conditions, without negatively influencing the function and operation of the implement for the loosening of soil and of the additional, power take-off shaft-driven implement for the seedbed preparation which is to be combined with the former implement.

The invention solves this task thereby that the two parts of the support tube are arranged so as to extend to an angle relative to one another and are rigidly connected to one another at their upper ends, so that they together form a triangle which is open toward the bottom and at whose top there is arranged a coupling device for at least one upper link and at whose lower ends there are arranged coupling devices for at least one draft link each, these coupling devices also serving as support pockets for the support arm of a loosening bit.

The connecting members preferably are constructed as brackets fastened to the support tubes for implement tools which are arranged behind the loosening bits and are to be driven by the power take-off shaft of the tractor through at least one universal joint shaft, the brackets being releasably connected to screw-on angle-sections mounted on the frame of the implement.

In accordance with another feature of the invention, the support arms of the loosening bits are fastened in the support pockets so that they are easily releasable and vertically adjustable.

In accordance with another feature of the invention, the coupling bolts can be placed in bores of the support pockets so that they are easily releasable and removable.

When the loosening bits are arranged at a greater distance, the three-point coupling serves as a mounting stand of the implement on the power lift of the tractor, and the brackets, in the state of dismounting from the implement, releasably connected to one another through an intermediate frame serving as a stiffening member.

BRIEF DESCRIPTION OF THE DRAWING

The drawing is a perspective view of an implement according to the present invention.

DETAILED DESCRIPTION OF THE INVENTION

As this FIGURE shows, the implement for the loosening of soil which can be mounted to the tractor, not shown, has two support tubes 10a and 10b which extend at an angle relative to each other and are rigidly connected to each other at their upper ends, so that they together form a triangle or inverted V which is open toward the bottom and serves as a tunnel-shaped recess or passage for a universal joint shaft, not shown. Coupling plates 11a, 11b provided with forward bores 12 for the upper link and rearward bores 13 for the upper link are arranged at the upper end of the triangle 19. At the lower free ends 19b, support pockets 4 are arranged in which support arms 3 of loosening bits 1 with loosening shares 2 can be mounted so as to be releaseable and adjustable in various heights by passing support screws 5 through bores 3a of the support arms 3. The support arm 3 is fixed approximately in the vertical direction by means of locking screws 6 located in front of their forward, narrow sides. In the forward portion of the side walls 4a,4b of the support pockets 4, bores 7c for coupling bolts 7a,7b are arranged which are fastened so as to be easily releasable and serve for receiving the spherical eyes, not shown, of the draft links of the power lift of the tractor. The upper link of the power lift of the tractor is engaged through the forward bores 12 for the upper link. The side walls 4a and 4b of the support pocket 4 welded to the lower end of the support tubes 10a,10b are connected in their rearward region and, through plates 8, at the bottom.

The lower ends of the support tubes 10a,10b are additionally connected, directly and through additional reinforcement plates 9, to brackets 15a,15b which are releasably fastened in one position or in several different positions to appropriately arranged screw-on rails 17 of an implement frame 16. The triangle 19 formed by the support tubes 10a,10b also serves as the mounting stand for the implement 21 arranged behind the implement for the loosening of soil. If necessary, this implement 21 can be exchanged for different implements with screw-on rails 17 of the same type. In addition, the implement 21 can be used by itself, because the support arms 3 of the loosening bits 1 are easily releasably fastened in the support pockets 4.

The implement for the loosening of soil can also be used by itself by separating it including the brackets 15a,15b from the implement for seedbed preparation. When the implement is used with large tractors or on heavy soil or for greater working depths, it is advantageous, in this case, to connect the brackets 15a,15b with each other by means of an additional intermediate frame 18 which forms an additional reinforcement of the support pockets 4 relative to each other, because it changes the mounting triangle 19 which is open toward the bottom to a closed mounting triangle.

The fact that the implement 16 is releasably connected to the support tube 10a,10b always in the same vertical position and in an otherwise rigid connection, has no negative influence on the quality of the work, because the working depth of the implement can be adjusted through the vertical position of the support tube 10a,10b above the soil by means of known support wheels, not shown, or by means of the so-called "position control" of the power lift of the tractor and, in addition, the support arms of the loosening bits can be arranged in different vertical positions in the support pockets, so that the working depths of the loosening bits can be adjusted to all conditions.

Since, moreover, a horizontal support tube is no longer provided in the region of the support arms 3 of the implement for the loosening of soil, the danger of cloggings of the implement for the loosening of soil is prevented and, therefore, work under difficult conditions, for example, on fields covered with straw or corn or grains, is facilitated.

While a specific embodiment of the invention has been shown and described in detail to illustrate the application of the inventive principles, it will be understood that the invention may be embodied otherwise without departing from such principles.

I claim:

1. An implement for loosening soil arranged to be propelled by a tractor as the tractor travels on the surface of the soil, comprising at least one supporting structure extending transversely of the direction of travel thereof, whenever it is propelled by the tractor, at least two loosening bits releasably connected to said supporting structure, means attached to said supporting structure for mounting additional implements whose tools are to be driven by the power take-off of the tractor through at least one universal joint shaft, said supporting structure having the shape of an inverted V arranged with the apex thereof extending upwardly from the loosening bits so as to form a passage for enabling the universal joint shaft driving the tools of an additional implement to extend therethrough, said supporting structure carrying at its apex upper coupling means and the two lower ends of said supporting structure carrying lower coupling means, said loosening bits arranged upwardly adjustably in said lower coupling means, said upper and lower coupling means being adapted for engagement with link members linking said supporting structure with the tractor.

2. The implement according to claim 1, wherein said supporting structure is comprised of two supporting members connected to one another at said apex of said supporting structure.

3. The implement according to claim 2, wherein said two supporting members are tubular members.

4. The implement according to claim 1, wherein said means for mounting additional implements are brackets which are connected to structural steel sections attached to an additional implement.

5. The implement according to claim 4, wherein said brackets and said structural steel sections are connected by means of screws.

6. The implement according to claim 1, comprising an element for stiffening said supporting structure when the additional implement is not connected to said supporting structure, said stiffening element extending between and connected to said means for mounting additional implements.

* * * * *